United States Patent
Cho et al.

(10) Patent No.: US 6,459,421 B1
(45) Date of Patent: Oct. 1, 2002

(54) ENCODING MODULE FOR A CURSOR INPUT DEVICE

(75) Inventors: Tim Cho, Taipei; Wen-Hsiang Tai, Taipei Hsien; Ming-Hheng Chiang, Taipei; Yu-Tang Chou, Taipei Hsien, all of (TW)

(73) Assignee: Kye Systems Corp. (TW)

( * ) Notice: Subject to any disclaimer, the term of this patent is extended or adjusted under 35 U.S.C. 154(b) by 0 days.

(21) Appl. No.: 09/453,844

(22) Filed: Dec. 2, 1999

(30) Foreign Application Priority Data

Dec. 4, 1998 (TW) ........................................ 87220216 U
Jun. 1, 1999 (TW) ........................................ 88208844 U (51) Int. Cl.⁷ ................................................. G09G 5/08
(52) U.S. Cl. ...................................... 345/166; 345/163
(58) Field of Search ................................ 345/156, 157, 345/158, 163–167, 173, 184

(56) References Cited

U.S. PATENT DOCUMENTS 5,446,481 A * 8/1995 Gillick et al. ................ 345/163
5,912,661 A * 6/1999 Siddiqui ....................... 345/166
5,963,197 A * 10/1999 Bacon et al. ................. 345/163
6,097,371 A * 8/2000 Siddiqui et al. ............. 345/164

* cited by examiner

Primary Examiner—Bipin Shalwala
Assistant Examiner—Jeff Piziali
(74) Attorney, Agent, or Firm—Raymond Sun (57) ABSTRACT

An encoding module for a cursor input device includes an optical encoder roller rotatable relative a roller supporting frame about a horizontal axis, a base member having the roller supporting frame on the base member such that the roller supporting frame is movable vertically toward and away from the base member, a switch mounted on the base member and disposed below a switch actuating block of the roller supporting frame such that downward movement of the roller supporting frame relative to the base member will enable the switch actuating block to engage the switch. The roller engages intermittently the roller supporting frame to permit rotation of the roller relative to the roller supporting frame in steps.

10 Claims, 12 Drawing Sheets

ENCODING MODULE FOR A CURSOR INPUT DEVICE

BACKGROUND OF THE INVENTION

1. Field of the Invention

The invention relates to an encoding module, and more particularly to an encoding module that is easily assembled.

2. Description of the Related Art

A cursor input device, such as a mouse, can be used to control cursor movement and function selection. A conventional mouse used with a personal computer is usually a two-dimensional one for controlling the cursor movement on an X-Y plane on the monitor screen.

However, such a two-dimensional mouse can no longer meet users needs in view of the increased requirement for convenience in operational operating system interfaces. A three-dimensional mouse, which can be used to define a certain system control function, has been disclosed in U.S. Pat. Nos. 5,530,455 and 5,808,568. However, the devices disclo in U.S. Pat. Nos. 5,530,455 and 5,80.8,568 require many more components, than required for a two-dimensional mouse thereby resulting in inconvenience during assembly.

SUMMARY OF THE INVENTION

Therefore, the object of the present invention is to provide an encoding module that can be easily assembled.

According to the present invention, an encoding module is adapted for a cursor input device and includes an optical encoder roller, a roller supporting frame, a base member, installing means, biasing means, a switch, and rotation control means.

The optical encoder roller has first and second lateral surfaces, a plurality of angularly disposed apertures that extend through the first and second lateral surfaces, and an axle extending axially through the roller, and has opposite end portions that project respectively from the first and second lateral surfaces.

The roller supporting frame has front and rear parts and opposite lateral parts that interconnect the front and rear parts to form the roller supporting frame with a roller opening. Each of the lateral parts is formed with an upwardly extending axle support that has a respective one of the end portions of the axle mounted thereon such that a lower portion of the roller extends through the roller supporting frame at the roller opening and such that the roller is rotatable relative to the roller supporting frame about a horizontal axis. The roller supporting frame further has a switch actuating block that extends from one of the lateral parts outwardly of the roller opening.

The installing means installs the roller supporting frame on the base member such that the roller supporting frame is movable vertically toward and away from the base member.

The biasing means is disposed between the base member and the roller supporting frame for biasing the roller supporting frame upwardly and away from the base member.

The switch is mounted on the base member, and is disposed below the switch actuating block such that downward movement of the roller supporting frame relative to the base member will enable the switch actuating block to engage the switch.

The rotation control means, which is provided on the roller and the roller supporting frame, enables intermittent releasable engagement between the roller and the roller supporting frame so as to permit rotation of the roller relative to the roller supporting frame in seeps.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED IMBODIMENTS

Before the present invention is described in greater detail, it should be noted that like elements are denoted by the same reference numerals throughout the disclosure.

Referring to FIGS. 1 to 4, the first preferred embodiment of an encoding nodule for a cursor input device, such as a mouse, is shown to include an optical encoder roller 4, a roller supporting frame 3, a base member 2, biasing means 5, a switch 23, an optical transmitter 24, an optical receiver 25, and rotation control means 6. In the embodiment, the cursor input device is a mouse.

In this embodiment, the optical encoder roller 4 has first and second lateral surfaces, and includes an encoder disc 40 formed with a plurality of angularly is displaced apertures 400 that extend through the first and second lateral surfaces, an annular rim flange 42 that extends from a periphery of the encoder disc 40 and that has an inner wall surface formed with a plurality of angularly displaced positioning grooves 421, and an axle 41 extending axially through the encoder disc 40 and having opposite end portions 411 that project respectively from the first and second lateral surfaces. The encoder disc 40 and the rim flange 42 cooperate to confine a cavity therein. The roller 4 is provided with a rubber tire 43 for traction purposes.

The roller supporting frame 3, which is a unitary piece that is formed integrally, has front and rear parts 35 and opposite lateral parts 34 that interconnect the front and rear parts 35 to form the roller supporting frame 3 with a roller opening 30. Each of the lateral parts 34 is formed with an upwardly extending axle support 31 that has an axle hole 311 and a vertically extending notch 312 for permitting insertion of a respective one of the end portions 411 of the axle 41 into the axle hole 311 such that a lower portion of the roller 4 extends through the roller supporting frame 3 at the roller opening 30 and such that the roller 4 is rotatable relative to the roller supporting frame 3 about a horizontal axis. The roller supporting frame 3 further has a switch actuating block 32 that extends from one of the lateral parts 34 outwardly of the roller opening 30.

The base member 2 includes a base housing 21, and a printed circuit board 20 disposed in the base housing 21. The, base member 2 is formed with an opening 200 aligned with the roller opening 30 for extension of the lower portion of the roller 4.

The installing means installs the roller supporting frame 3 on the base member 2 such that the roller supporting frame 3 is movable vertically toward and away from the base member 2. In this embodiment, the installing means includes a pair of vertically extending guide posts 33 disposed respectively on the front and rear parts 35 of the roller supporting frame 3, and a pair of vertically extending guide rails 26 mounted on the base housing 21 and extending through the printed circuit board 20. he guide rails 26 engage slidably and respectively the guide posts 33 to guide upward and downward movement of the roller supporting frame 3 relative to the base member 2.

The biasing means is disposed between the base member 2 and the roller supporting frame 3 for biasing the roller supporting frame 3 upwardly and away from the base member 2. In this embodiment, the biasing means includes a pair of compression springs 5, each of which is disposed between the base member 2 and a respective one of the guide posts 33.

The switch 23 is mounted on the printed circuit board 20 of the base member 2, and is disposed below the switch actuating block 32 such that downward movement of the roller supporting frame 3 relative to the base member 2 when the roller 4 is pressed will enable the switch actuating block 32 to engage the switch 23.

The optical transmitter 24 and the optical receiver 25 are mounted spacedly on the printed circuit board 20 of the base member 2 in the direction of the horizontal axis such that an optical signal generated by the optical transmitter 24 can be received by the optical receiver 25. The lower portion of the roller 4 extends between the optical transmitter 24 and the optical receiver 25 such that the rotation of the roller 4 relative to the roller supporting frame 3 will cause the optical signal from the optical transmitter 24 to penetrate intermittently through the lower portion of the roller 4 via the apertures 400.

The rotation control means 6, which is provided on the roller 4 and the roller supporting frame 3, enables intermittent releasable engagement between the roller 4 and the roller supporting frame 3 so as to permit rotation of the roller 4 relative to the roller supporting frame 3 in steps. In this embodiment, the rotation control means 6 includes a sleeve member 60 disposed in the cavity of the roller 4, and a spring-loaded retainer 61. The sleeve member 60 has a first and, and a second end opposite to the first end. The first end is formed with a sleeve portion 600 sleeved on the axle 41, and a connecting groove 602 for connecting with the axle support 31 on one of the lateral parts 34 of the roller supporting frame 3. The second end is formed with a receiving groove 601. The spring-loaded retainer 61 is mounted retractably in the receiving groove 601 of the sleeve member 60, and extends toward the rim flange 42 for engaging releasably the positioning grooves 421.

Figure 1:
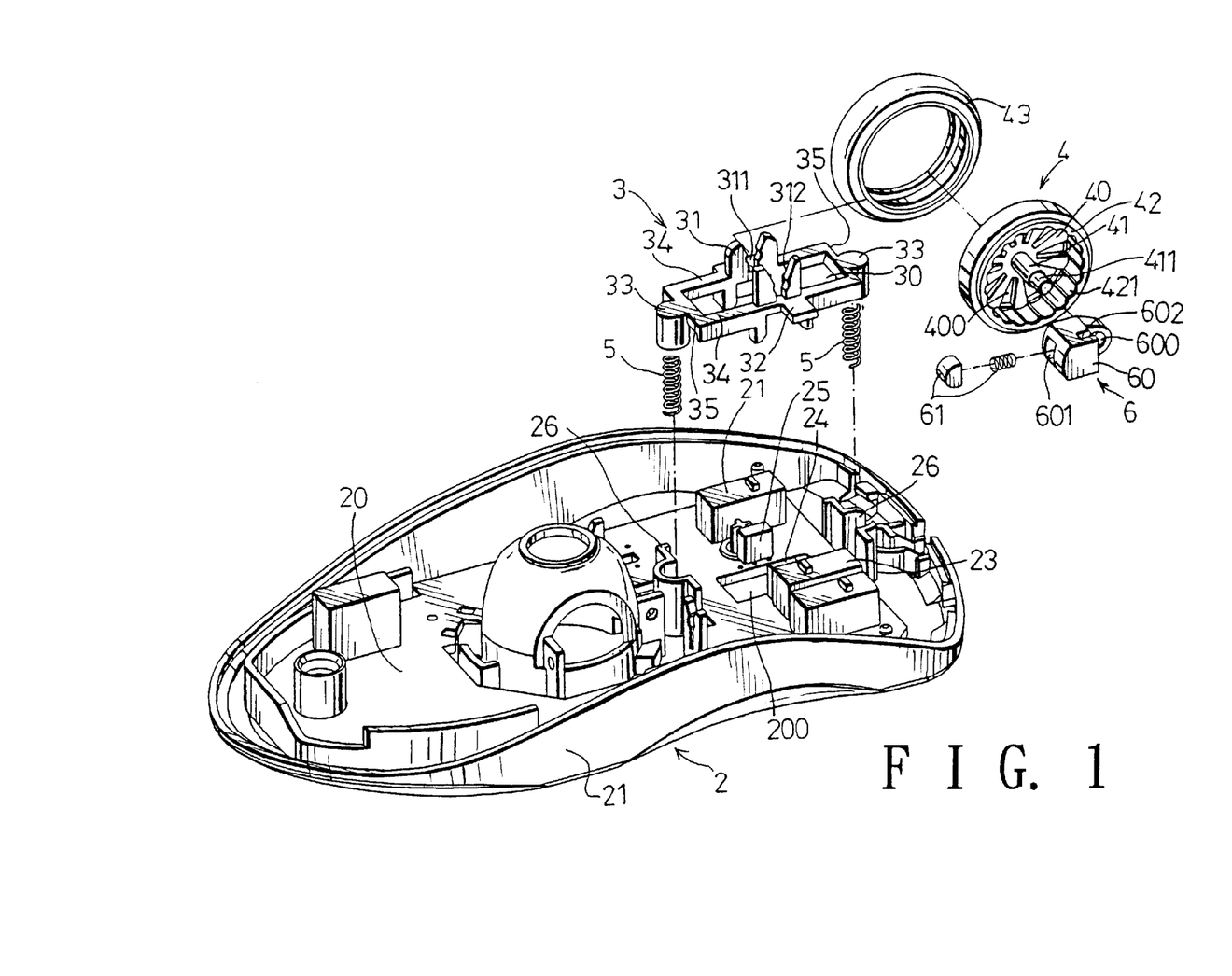
FIG. 1 is an exploded perspective view showing a first preferred embodiment of an encoding module for a mouse according to the present invention.
Figure 2:
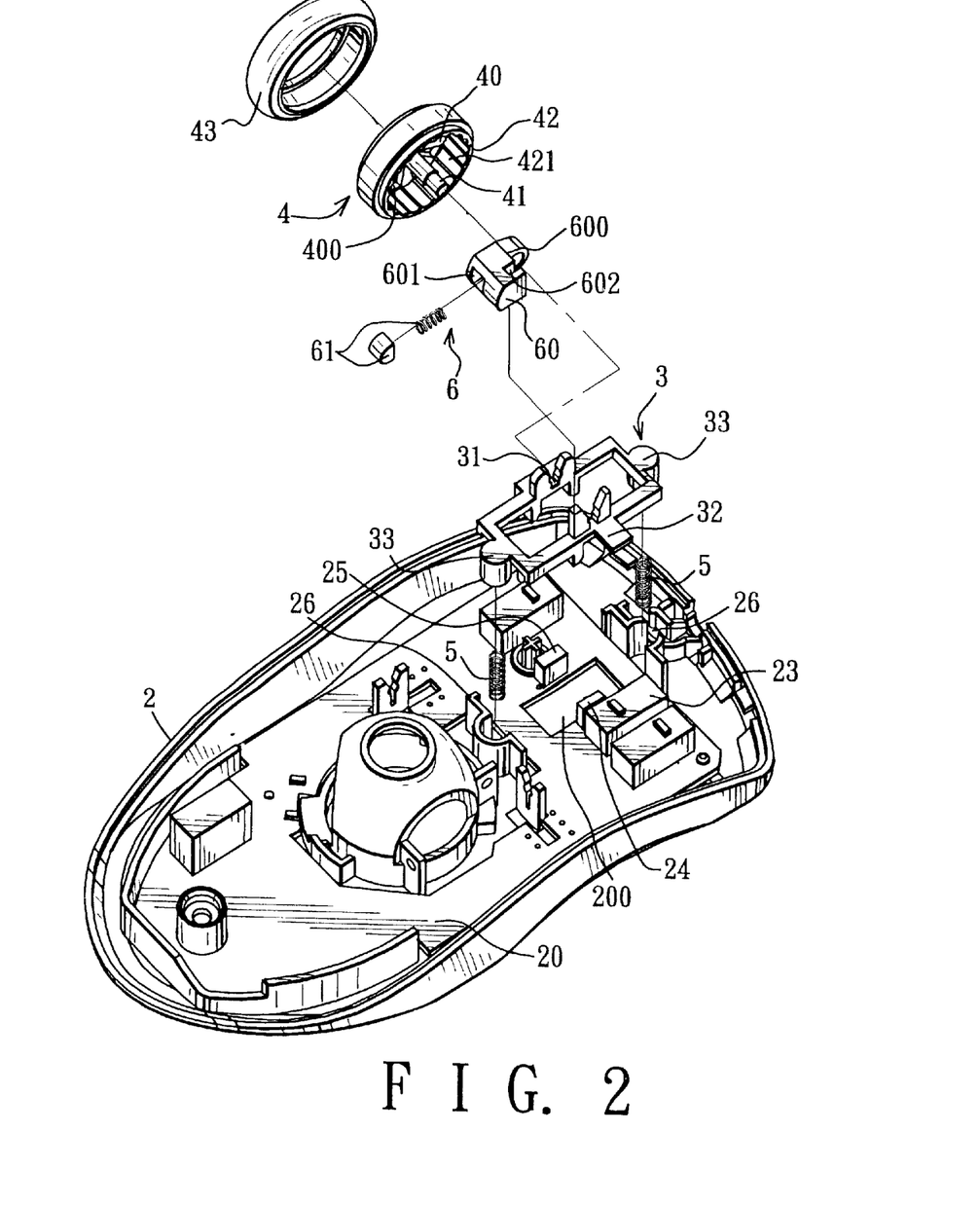
FIG. 2 is another exploded perspective view of the first preferred embodiment.
Figure 3:
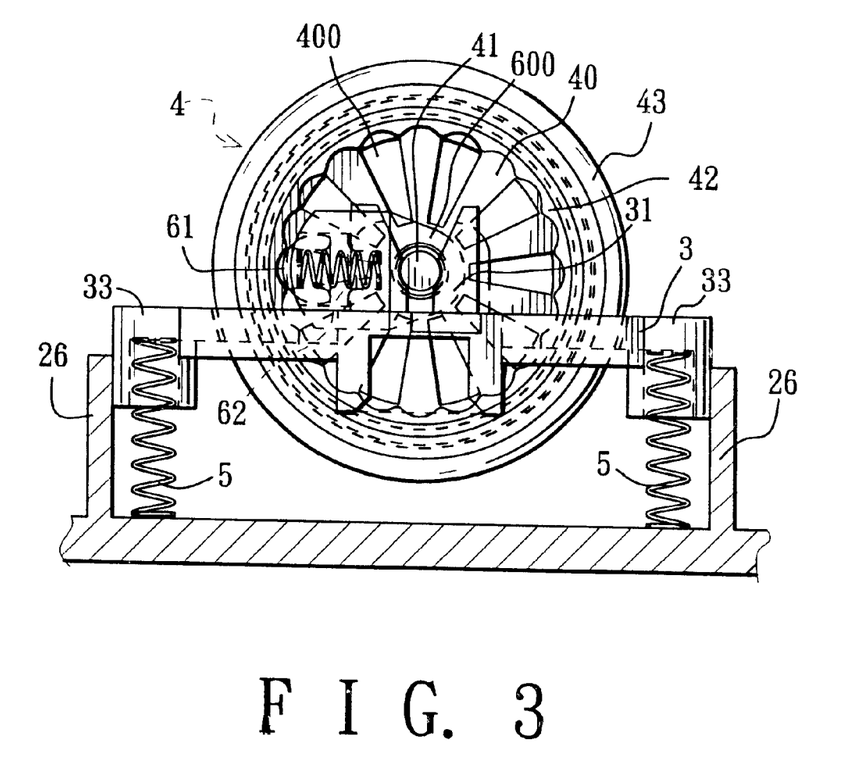
FIG. 3 is a fragmentary schematic view of the first preferred embodiment in an assembled state.
Figure 4:
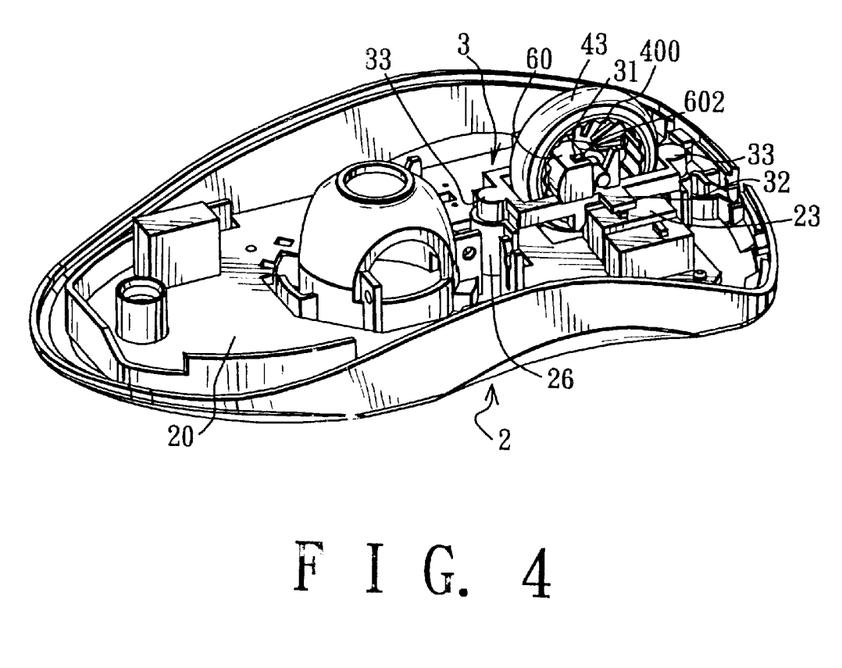
FIG. 4 is a perspective view showing the first preferred embodiment in the assembled state.
Figure 5:
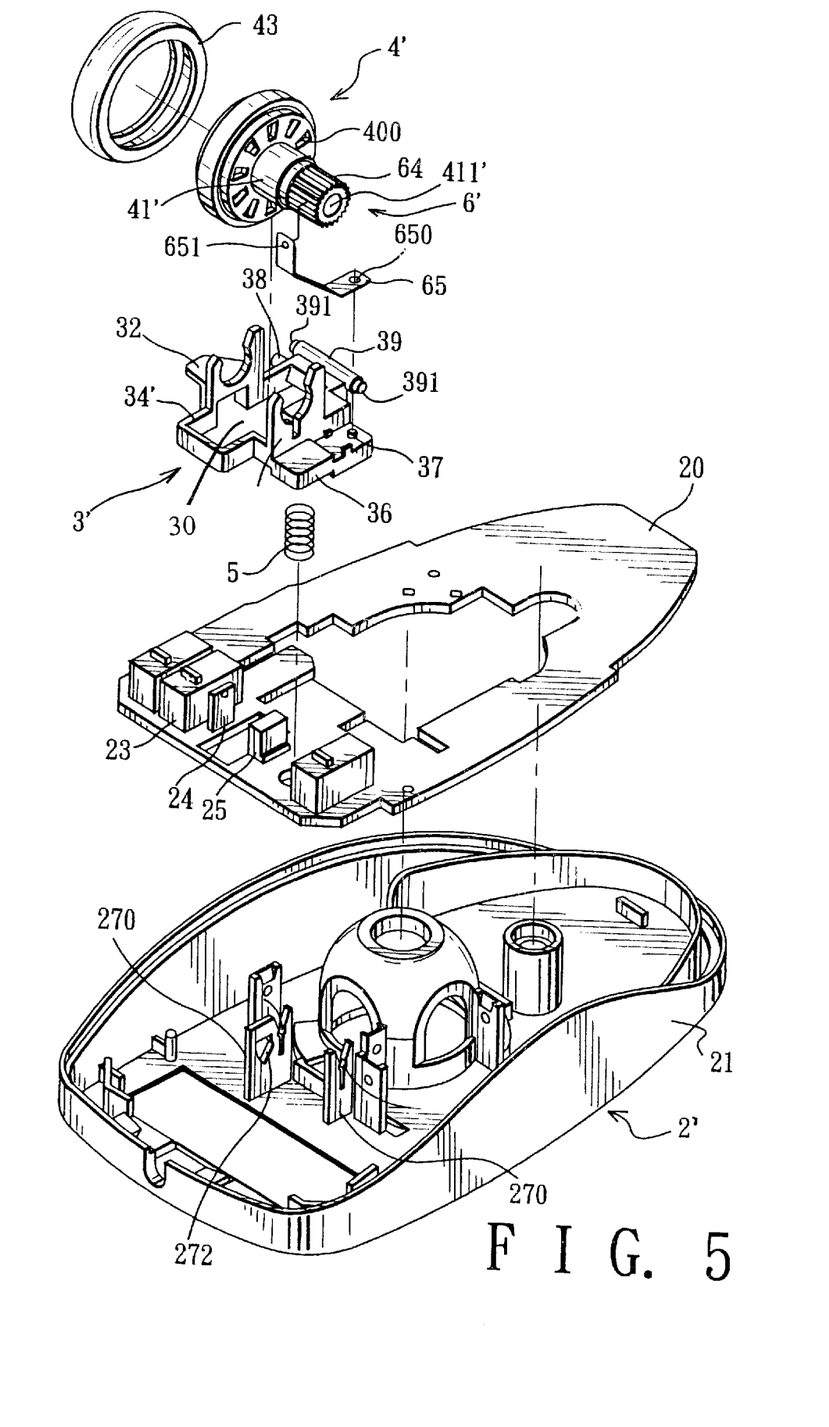
FIG. 5 is an exploded perspective view showing a second preferred embodiment of an encoding module for a mouse according to the present invention.
Figure 6:
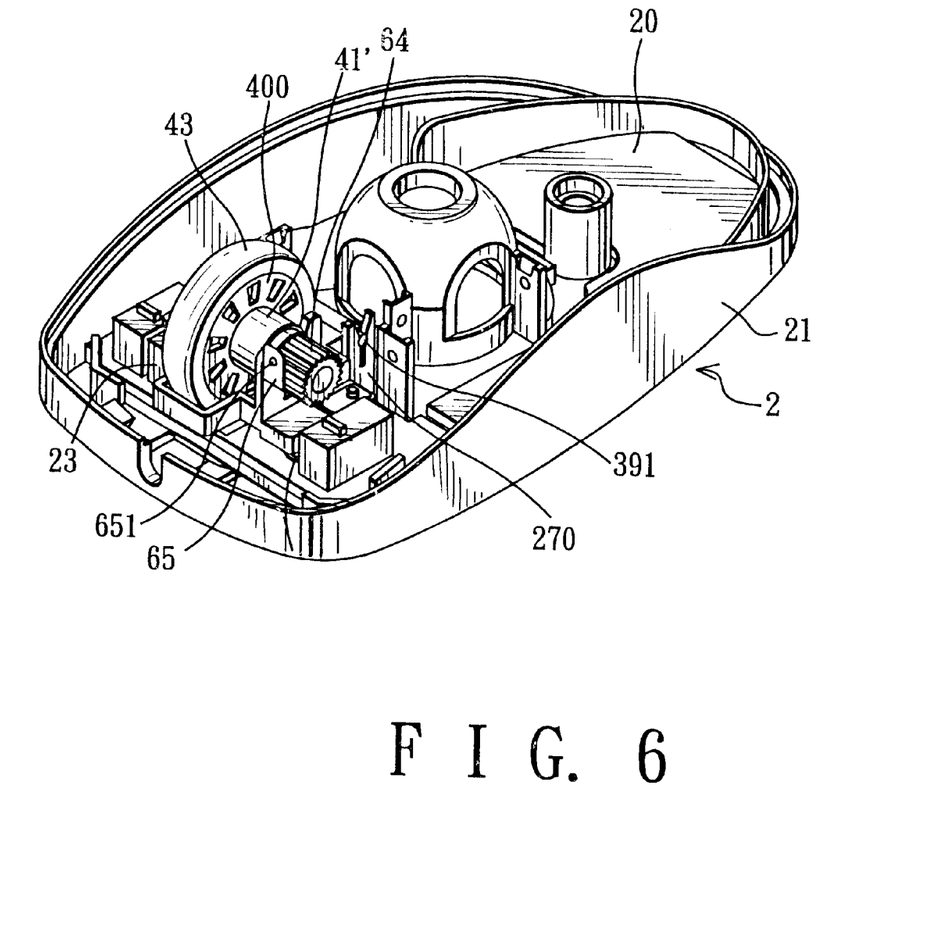
FIG. 6 is a perspective view showing the second preferred embodiment in an assembled state.

FIGS. 5 and 6 illustrate a second preferred embodiment of the present invention, which is a modification the first preferred embodiment. Unlike the previous embodiment, the installing means includes a horizontal pivot shaft 39 provided on the rear part of the roller supporting frame 3', and a pair of vertically extending shaft supporting members 270 that extend from the base member 2' and that engage opposite ends 391 of the pivot shaft 39, thereby mounting pivotally the roller supporting frame 3' on the base member 2' about the axis of the pivot shaft 39. The roller supporting member 3' further has a limit block 38 that extends from one of the lateral parts 34' outwardly of the roller opening 30'. One of the shaft supporting members 270 is formed with a sector opening 272 through which the limit block 38 extends to limit range of pivoting movement of the roller supporting frame 3' relative to the base member 2'. The rotation control means 6' includes a gear 64 and a metal spring plate 65. The gear 64 is mounted coaxially on one of the end portions 411' of the axle 41' for co-rotation therewith, and has a periphery formed with a plurality of teeth. The spring plate 65 has one end formed with an anchoring hole 650 anchored on a post 37 that is provided on the roller supporting frame 3', and a distal end extending toward the gear 64 and formed with a boss 651 for engaging releasably the teeth on the gear 64. The boss 651 is slightly larger than the space between adjacent teeth on the gear 64 to reduce resistance to rotation of the roller 4'. The biasing means includes a compression spring 5 disposed between the base member 2' and an extension 36 on the roller supporting frame 3' that is diagonally opposite to the limit block 38.

Figure 7:
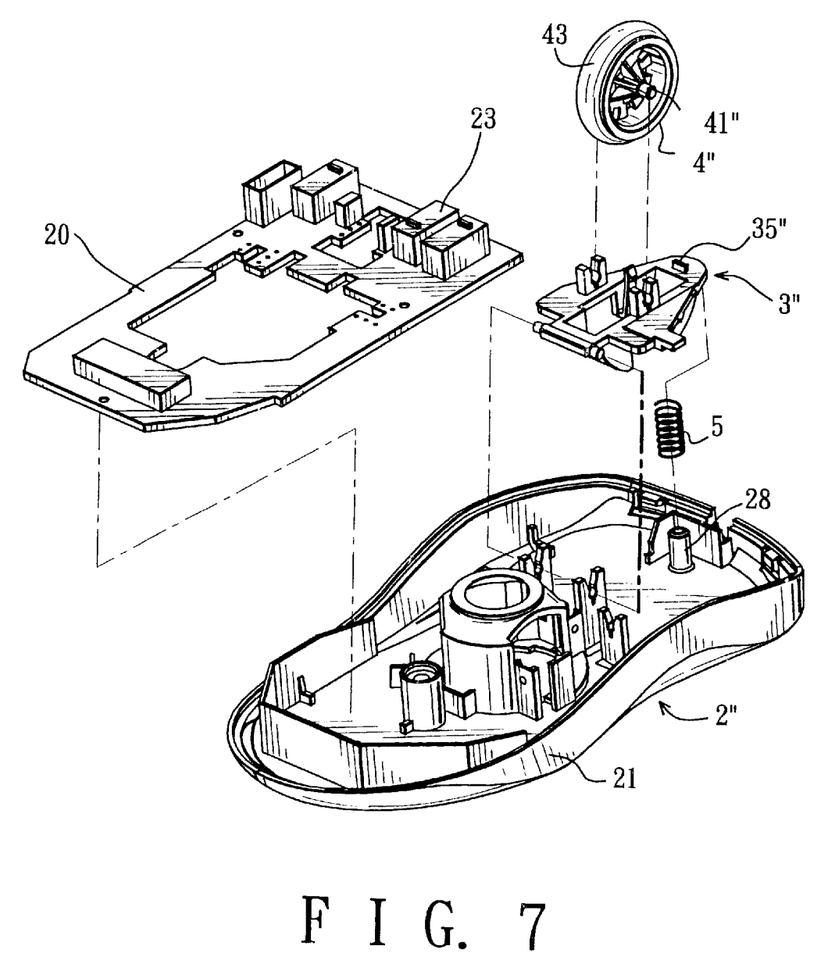
FIG. 7 is an exploded perspective view showing a third preferred embodiment of an encoding module for a mouse according to the present invention.
Figure 8:
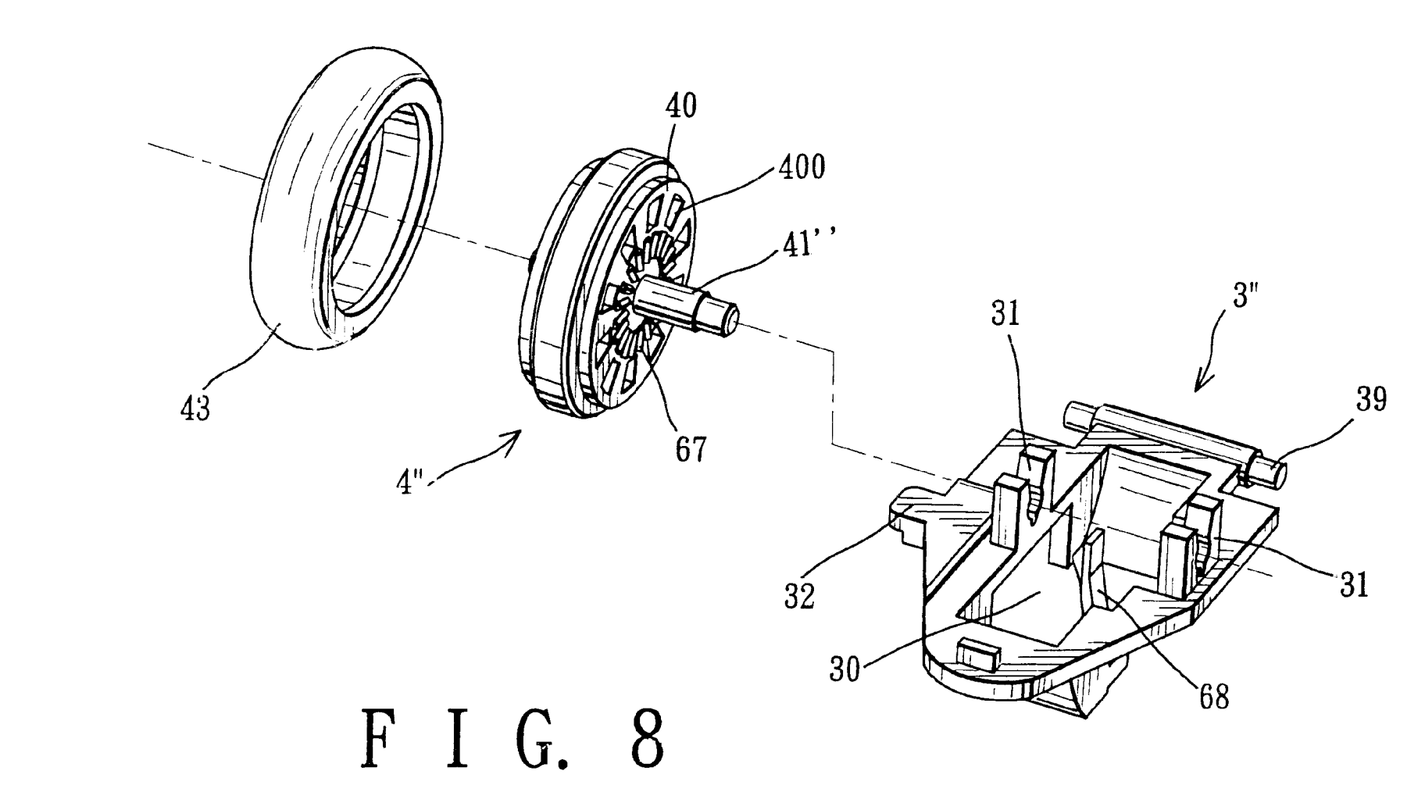
FIG. 8 is a exploded perspective view showing an optical encoder roller and a roller supporting frame of the third preferred embodiment.
Figure 9:
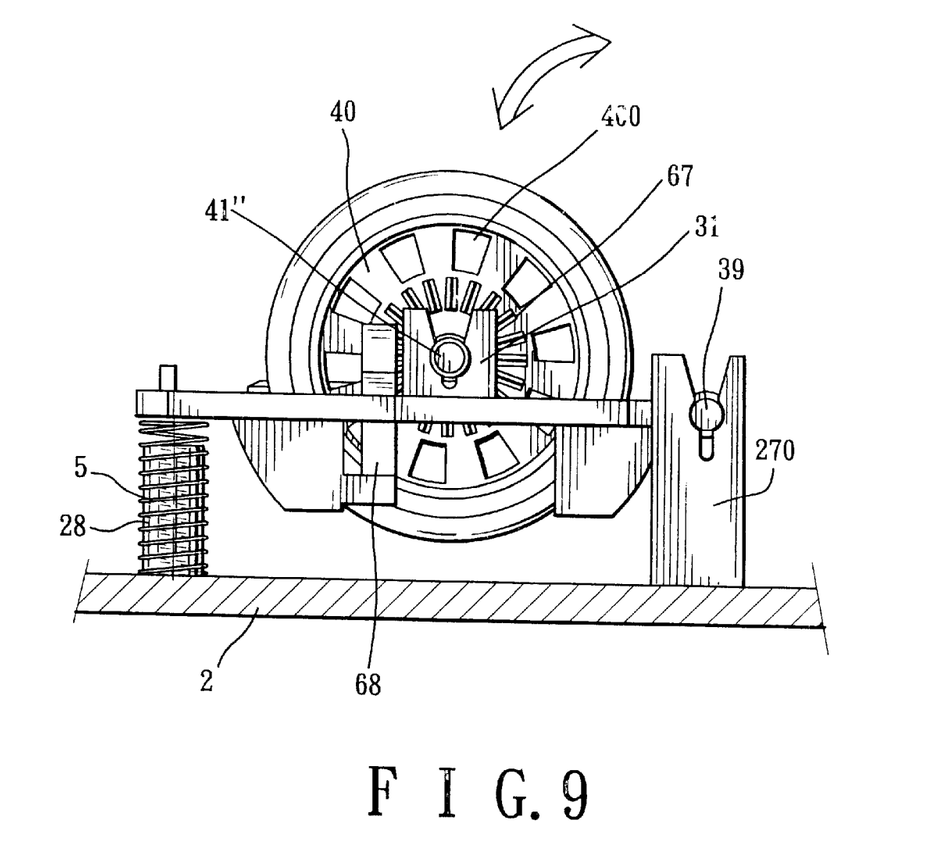
FIG. 9 is a fragmentary schematic view showing the third preferred embodiment in an assembled state.

FIGS. 7 to 9 illustrate a third preferred embodiment of the present invention, which is a modification of the second preferred embodiment. Unlike the preceding embodiment, the base member 2" has a stop post 28 that extends toward the front part 35" of the roller supporting frame 3" to limit the range of downward pivoting movement of the roller supporting frame 3" relative to the base member 2". The biasing means includes a coiled compression spring 5 sleeved on the stop post 28 and having opposite ends that abut respectively against the base member 2" and the front. part 35" of the roller supporting frame 3". The rotation control means includes a plurality of angularly displaced protuberances 67 formed on one of the lateral surfaces of the roller 4", and a resilient member 68 having one end secured to one of the lateral parts of the roller supporting frame 3" and an opposite end that extends toward the roller 4" and that engages releasably the protuberances 67.

Figure 10:
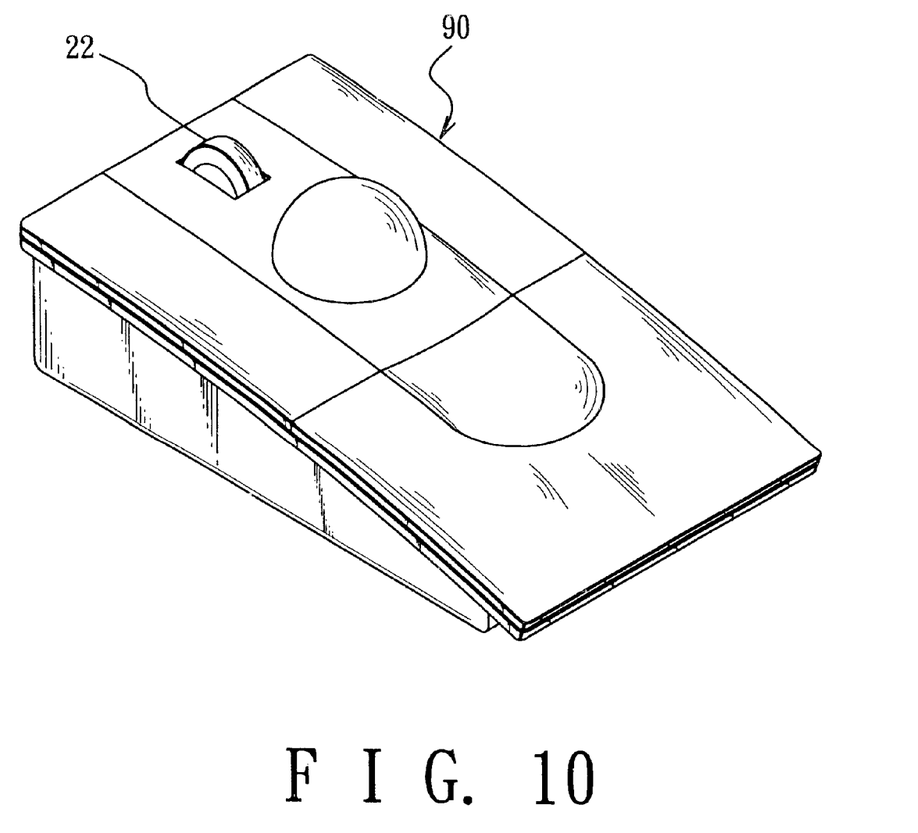
FIG. 10 is a perspective view showing a fourth preferred embodiment of an encoding module for a trackball device according to the present invention.
Figure 11:
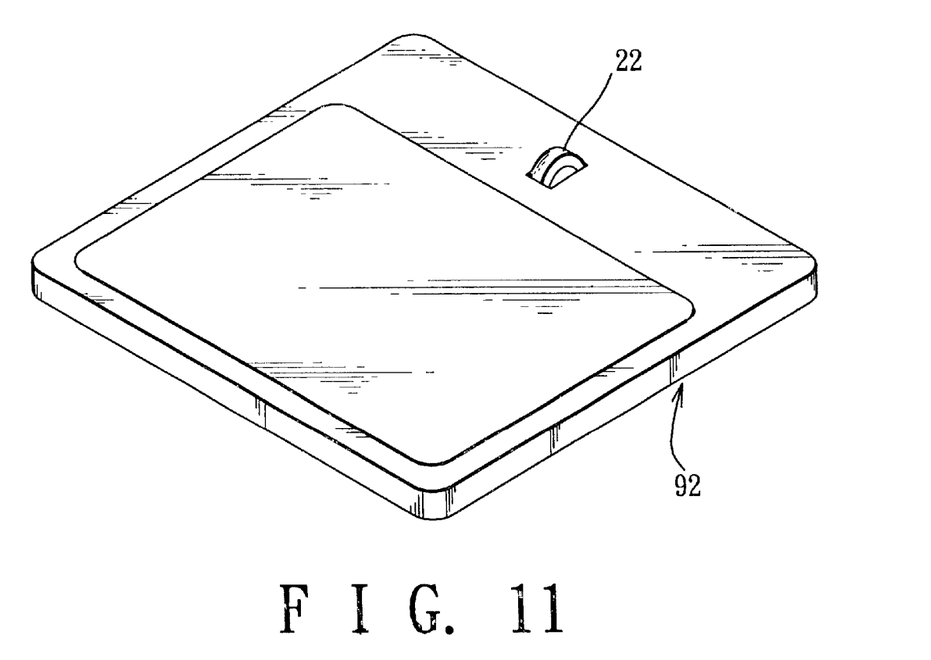
FIG. 11 is an exploded perspective view showing a fifth preferred embodiment of an encoding module for a touch pad according to the present invention.
Figure 12:
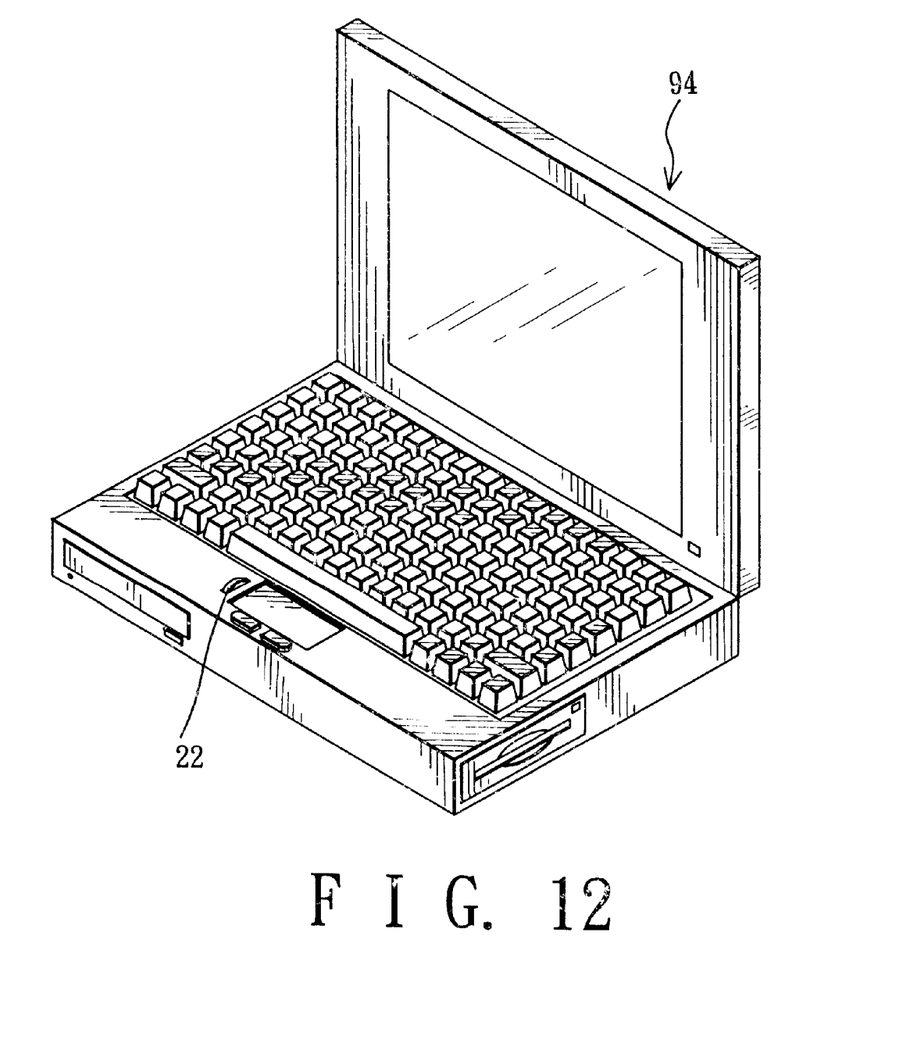
FIG. 12 is an exploded perspective view showing the sixth preferred embodiment of an encoding module for a notebook computer according to the present invention.

FIGS. 10 to 12 respectively illustrate the fourth to sixth preferred embodiments of this invention. In FIG. 10, the encoding module 22 is installed in a track ball device 90. In FIG. 11, the encoding module 22 is installed in a touch pad 92. In FIG. 12, the encoding module 22 is installed in a notebook computer device 99.

In the present invention, the roller supporting frame, the roller, the biasing means and the rotation control means can be easily assemble on the base member to provide the encoding function. The object of the invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An encoding module for a cursor input device, comprising:

an optical encoder roller having first and second lateral surfaces, a plurality of angularly disposed apertures that extend through said first and second lateral surfaces, and an axle extending axially through said roller and having opposite and portions that project respectively from said first and second lateral surfaces;

a roller supporting frame having front and rear parts and opposite lateral parts that interconnect said front and rear parts to form said roller supporting frame with a roller opening, each of said lateral parts being formed with an upwardly extending axle support that has a respective one of said end portions of said axle mounted thereon such that a lower portion of said roller extends through said roller supporting frame at said roller opening and such that said roller is rotatable relative to said roller supporting frame about a horizontal axis, said roller supporting frame further having a switch actuating block that extends from one of said lateral parts outwardly of said roller opening;

a base member;

installing means for installing said roller supporting frame on said base member such that said roller supporting frame is movable vertically toward and away from said base member;

biasing means disposed between said base member and said roller supporting frame for biasing said roller supporting frame upwardly and away from said base member;

a switch mounted on said base member and disposed below said switch actuating block such that downward movement of said roller supporting frame relative to said base member will enable said switch actuating block to engage said switch;

rotation control means, provided on said roller and said roller supporting frame, for intermittent releasable engagement between said roller and said roller supporting frame so as to permit rotation of said roller relative to said roller supporting frame in steps; and an optical transmitter and an optical receiver mounted in spaced-apart manner on the base member, with said roller having a lower portion positioned between said optical transmitter and said optical receiver such that rotation of said roller relative to said roller supporting frame will cause the optical signal from said optical transmitter to intermittently extend through one of said apertures in the roller to be detected by said optical receiver.

2. The encoding module of claim 1, wherein said roller includes an encoder disk formed with said apertures and an annular rim flange that extends from a periphery of said encoder disk toward one of said lateral parts of said roller supporting frame and that has an inner wall surface formed with a plurality of angularly displaced positioning grooves, said encoder disk and said rim flange cooperating to confine a cavity therein.

3. The encoding module of claim 1, wherein said roller is provided with a tire for traction purposes.

4. The encoding module of claim 1, wherein said base member has a stop post that extends toward said front part of said roller supporting frame to limit the range of downward pivoting movement of said roller supporting frame relative to said base member.

5. The encoding module of claim 4, wherein said biasing means includes a coiled compression spring sleeved on said stop post and having opposite ends that abut respectively against said base member and said front part of said roller supporting frame.

6. The encoding module of claim 1, wherein said rotation control means includes:

a plurality of angularly displaced protuberances formed on one of said lateral surfaces of said roller; and a resilient member having one end secured to one of said lateral parts of said roller supporting frame and an opposite end that extends toward said one of said lateral surfaces of said roller and that engages releasably said protuberances.

7. The encoding module of claim 1, wherein each of said axle supports has an axle hole and a vertically extending notch that permits insertion of one of said end portions of said axle into said axle hole.

8. The encoding module of claim 1, wherein said roller supporting frame is a unitary piece that is formed integrally.

9. The encoding module of claim 1, wherein the cursor input device is one of a trackball, a touch pad and a notebook computer.

10. An encoding module for a cursor input device, comprising: an optical encoder roller having first and second lateral surfaces, and an axle extending axially through said roller and having opposite end portions that project respectively from said first and second lateral surfaces;

a roller supporting frame having front and rear parts and opposite lateral parts that interconnect said front and rear parts to form said roller supporting frame with a roller opening, each of said lateral parts being formed with an upwardly extending axle support that has a respective one of said end portions of said axle mounted thereon such that a lower portion of said roller extends through said roller supporting frame at said roller opening and such that said roller is rotatable relative to said roller supporting frame about a horizontal axis, said roller supporting frame further having a switch actuating block that extends from one of said lateral parts outwardly of said roller opening;

a base member;

biasing means disposed between said base member and said roller supporting frame for biasing said roller supporting frame upwardly and away from said base member;

means for installing said roller supporting frame on said base member such that said roller supporting frame is movable vertically toward and away from said base member, said installing means including:

a pair of vertically extending shaft supporting members that extend from said base member;

a horizontal pivot shaft positioned on said rear part of said roller supporting frame, and having opposite ends, each end of said pivot shaft being pivotally coupled to a separate shaft supporting member; and wherein said front part of said roller supporting frame contacts the biasing means which pivots said roller supporting frame about an axis defined by said pivot shaft;

switch mounted on said base member and disposed below said switch actuating block such that downward movement of said roller supporting frame relative to said base member will enable said switch actuating block to engage said switch;

rotation control means, provided on said roller and said roller supporting frame, for intermittent releasable engagement between said roller and said roller supporting frame so as to permit rotation of said roller relative to said roller supporting frame in steps.

* * * * *